United States Patent [19]

Linderman R. Ivan

[11] Patent Number: 4,816,155
[45] Date of Patent: Mar. 28, 1989

[54] JUICE DRAINAGE SYSTEM
[75] Inventor: Linderman R. Ivan, Tiburon, Calif.
[73] Assignee: KLR Machines, Inc., Bath, N.Y.
[21] Appl. No.: 885,283
[22] Filed: Jul. 14, 1986
[51] Int. Cl.⁴ .............................................. B01D 29/00
[52] U.S. Cl. ..................................... 210/459; 99/495; 73/863.81; 137/545; 137/561 A
[58] Field of Search .................... 210/155, 162, 323.2, 210/459, 499; 99/495; 137/561 A, 545, 883; 251/145; 73/863.21, 863.23, 863.41, 863.81, 863.25; 138/37, 40

[56] References Cited
U.S. PATENT DOCUMENTS
4,169,793 10/1979 Lockshaw .......................... 210/238

Primary Examiner—Benoit Castel
Assistant Examiner—Richard D. Jordan
Attorney, Agent, or Firm—Larry D. Johnson

[57] ABSTRACT

An improved juice drainage system is incorporated into the mash line of juice processing equipment. Fruit or other mash is pumped through a relatively large-diameter, generally horizontal mash pipe. A plurality of relatively smaller-diameter tubes or juice drainage elements are inserted into and intersect the mash pipe in generally perpendicular orientation at selected points along its length. These drainage elements include screens or other openings forming a drainage surface, preferably on the "downstream" side of the elements, so that juice from the mash flowing through the mash pipe passes through the openings and into the drainage element. The size and shape of the openings can be designed to control the juice drainage rate from any particular drainage element. In addition, the drainage elements themselves can be specifically sized, placed, and/or oriented along the mash pipe to impart the desired mixing characteristics to the flowing mash.

5 Claims, 1 Drawing Sheet

U.S. Patent    Mar. 28, 1989    4,816,155
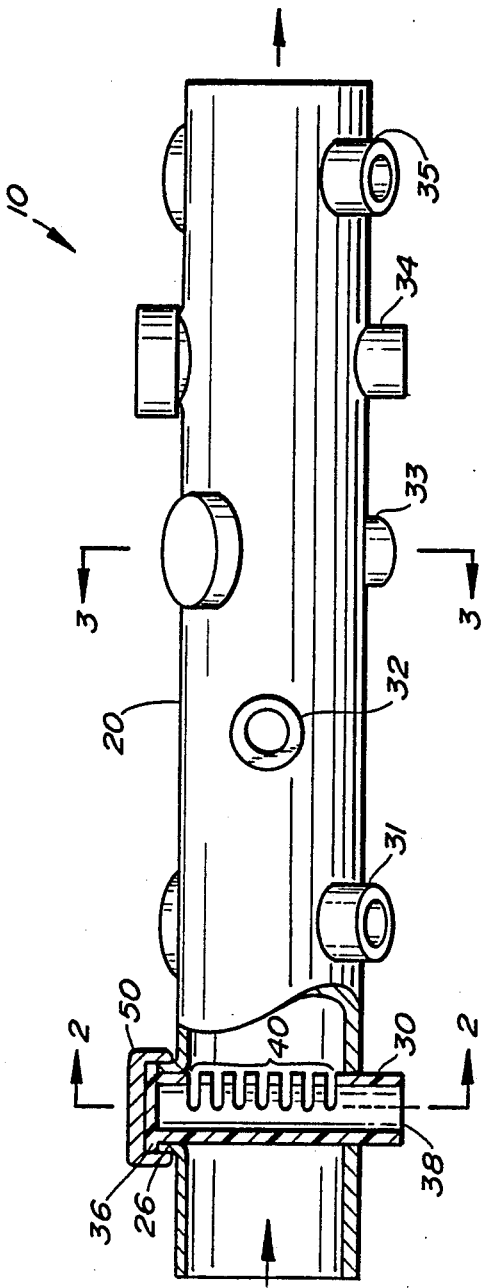
FIG._1
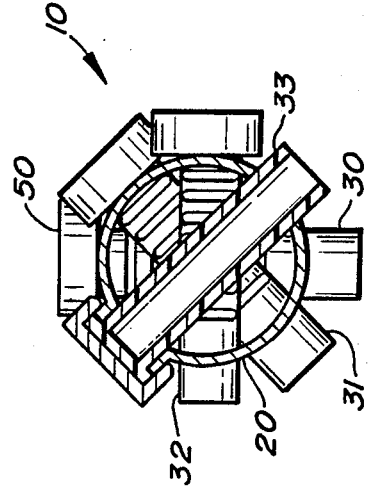
FIG._3
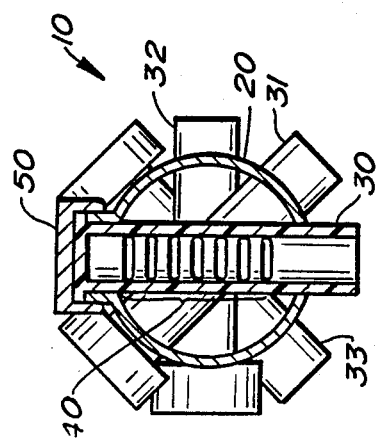
FIG._2
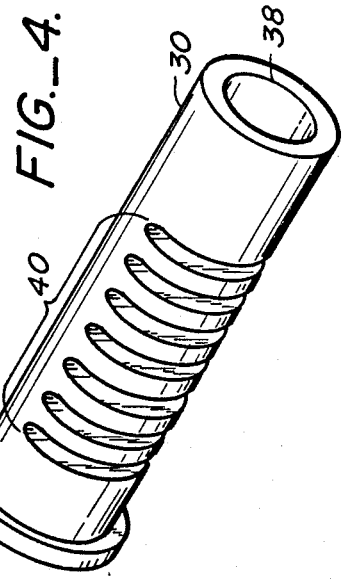
FIG._4

JUICE DRAINAGE SYSTEM

BACKGROUND OF THE INVENTION

1. Field of the Invention

The present invention relates generally to liquid-solid separators, and more specifically to juice processing and dejuicing equipment.

2. Description of the Prior Art

The production of fruit and vegetable juices typically includes the steps of the crushing of the fruit, the separating of the resultant juice from the pulp, and the further processing of the juice. Depending on the particular application, that intermediate step of separating the juice from the pulp is accomplished in various ways. In the wine industry, for example, after the grapes have been crushed, the pulp and juice "mash" is often pumped through a mash line to a drain tank or other unit to remove the easily accessible "free run" juice, before sending the remainder to a wine press for final juice extraction. Because of the costs associated with operating a press, it is desirable to maximize the amount of free-run juice, and minimize the use of the press.

However, the use of a drain tank itself has serious drawbacks. For example, while drain tanks are generally less expensive than presses, neither are inexpensive. Also, drain tanks occupy a large amount of space, and may require an expensive support structure for proper operation. Furthermore, the loading of the mash into and the unloading of the dejuiced mash from a drain tank can be difficult. In addition, stationary drain tanks are relatively inefficient since there is usually no provision for increasing mass transfer, while non-stationary drain tanks are more expensive and prone to mechanical difficulties due to the drive motors, bearings, and the like necessary to drive the tank. Still further, except for the weight in the drain tank of the mash itself, there is no provision for low pressure pressing of the mash during draining. Finally, the amount of juice drainage surface area in a drain tank is limited and competes with the drain tank volume.

Some dejuicing devices have been developed in an effort to reduce or eliminate drain tank requirements. For example, one device currently in use provides an inclined sheet of stainless steel, perforated by numerous small, circular holes over which a "ladder conveyor" passes. Mash is dragged across this surface and juice exits through the holes, while dejuiced mash is dragged up the incline and dumped into a press. However, this device allows significant exposure of and oxidation to the moving mash, and creates undesirable shearing forces to the mash all along the drag screen surface, particularly on the upper edges of the drain holes. Other devices have replaced the circular holes with elongated slots, which tends to reduce, but not eliminate, the shear forces on the mash, and of course do nothing to prevent oxidation of the mash.

SUMMARY OF THE INVENTION

The present invention provides an improved juice drainage system for incorporation into the mash line of juice processing equipment. Fruit or other mash is pumped through a relatively large-diameter, generally horizontal mash pipe. A plurality of relatively smaller-diameter tubes or juice drainage elements are inserted into and intersect the mash pipe in generally perpendicular orientation at selected points along its length. These drainage elements include screens or other openings forming a drainage surface, preferably on the "downstream" side of the elements, so that juice from the mash flowing through the mash pipe passes through the openings and into the drainage element. The size and shape of the openings can be designed to control the juice drainage rate from any particular drainage element. In addition, the drainage elements themselves can be specifically sized, placed, and/or oriented along the mash pipe to impart the desired mixing characteristics to the flowing mash. The juice thus separated from the mash drains out of the drainage elements via exit ports to a collection pipe or manifold where it is taken for further processing, if necessary. The dejuiced mash continues flowing out of the mash pipe and into a press or similar device for further dejuicing, if appropriate.

Thus, the juice drainage elements penetrating the mash pipe perform three functions: (1) the draining of juice from the pumped, flowing mash, (2) the mixing of the flowing mash, thereby breaking up the solids in the mash, creating new surfaces in the mash and increasing drainage, and (3) the applying and releasing of pressure on the flowing mash as it encounters these obstructions, which enhances mixing and expresses additional liquid, thereby still further improving drainage. These functions are all dependent upon the size, placement, and orientation of the drainage elements. In the preferred embodiment, the juice drainage elements intersect the longitudinal axis of the mash pipe in various, perpendicular orientations along its length. In this way, as mash is pumped through the pipe, the drainage elements provide frequent opportunities for juice drainage. In addition, the drainage elements present frequent obstructions to the mash flow, creating a controllable turbulence to an otherwise essentially laminar flow of the mash. This turbulence breaks up the mash and reorients its particles, producing the desired mixing effect. For particular applications, the specific placement and angular orientation of the elements along the mash pipe can impart a desired spin or vortex (or lack thereof) to the flow, thereby further increasing drainage. Furthermore, by periodically decreasing the mash pipe cross-sectional area by proper placement of these drainage elements, pressure is periodically applied to the mash, and subsequently released from it as it passes these obstructions. This pressure/non-pressure effect encourages the release of further liquid from the mash, as well as further enhances the mixing characteristics of the system.

The drainage surfaces of the juice drainage elements can similarly be sized, placed, and oriented to control the drainage rate. In the preferred embodiment, the drainage surfaces are hemicircumferential slots or screen cut into the downstream side of the elements. By placing the openings for the juice drainage surface on the rear or downstream side of the drainage elements, shearing of the mash is reduced, and drain surface clogging is minimized. In addition, liquid/solid separation is improved due to the cohesive property of liquids, and the liquid's tendency to flow back along such surfaces due to surface tension. Alternatively, the juice drainage surface could take the form of a longitudinally grooved, flexible core surrounded by filter cloths, or a tubular screen or similar structure, with drainage available around its entire surface.

The juice drainage elements penetrate the mash pipe and are attached to it from the outside by a securing mechanism. The juice drainage elements can be drained separately, or manifolded together into an external "free-run" juice pipe below the system such that juice exits the system by gravity.

Thus, juice from any particular drainage element may be separated or combined with juice from any other element. Alternatively, some or all of the drainage elements could be replaced with "non-draining" or solid elements, so that the system would act as a static mixer to the flowing mash, but would not separate the juice. As a further alternative, the juice drainage elements may be completely removed from the system, and their insertion points into the mash pipe sealed off, to provide the ability to use the system as a simple mash pipe without mixing, and without juice drainage. This feature also allows any particular element to be removed from the system for cleaning or replacement, without having to completely shut down and drain the system.

The juice drainage system of this invention is thus easily adaptable to existing juice processing equipment. The invention can be made in various lengths and diameters to accomodate any application. Since most standard juice processing equipment already includes a mash pipe, or some variation thereon, replacement of such a standard pipe with the system of this invention enables juice drainage where there was none before, and may even obviate the need for a drain tank. At the very least, installation of the improved system reduces the necessary throughput to the press, thereby increasing efficiency and reducing processing time.

BRIEF DESCRIPTION OF THE DRAWINGS

FIG. 1 is a partially cutaway elevated side view of the juice drainage system of this invention;

FIG. 2 is an elevated cross-sectional view of the system taken along line 2—2 of FIG. 1;

FIG. 3 is an elevated cross-sectional view of the system taken along line 3—3 of FIG. 1; and FIG. 4 is a perspective view of a juice drainage element removed from the system.

DETAILED DESCRIPTION OF A PREFERRED EMBODIMENT

FIG. 1 illustrates a juice drainage system 10 of this invention in a partially cutaway elevated side view. System 10 includes a mash pipe 20, which can be of any size or material suitable for carrying a flow of pumped slurry or mash, such as stainless steel, plastic, or the like. Pipe 20 is suitably oriented in a generally horizontal position, for ease in pumping a slurry through it, but it could be oriented in any other position, including vertically, and still function according to this invention.

Mash pipe 20 is penetrated at intervals along its length by a series of relatively smaller-diameter juice drainage elements 30–35, also constructed of any appropriate material for contacting the slurry. These drainage elements can be of any diameter, so long as it is less than the internal diameter of the mash pipe 20. In fact, the various drainage elements can be of different diameters within the same system, or any given element can vary in diameter along its own length. The elements preferably intersect the mash pipe in a generally perpendicular orientation to its longitudinal axis, that is, along selected diameters. However, as is illustrated in FIG. 1, the elements 30–35 are not necessarily coplanar with one another, but may intersect the mash pipe from different directions.

Drainage element 30, which is illustrated in FIG. 1 in cutaway view, shows a series of hemicircumferential cutouts or slots 40. These openings can themselves be of any size, shape, or orientation, and are preferably tailored to the specific application and type of slurry that will be pumped through the system. For example, hemicircumferential slots of 1/16"–¼" are suitably used for drainage of a crushed grape mash.

Element 30 is shown attached to pipe 20 by a securing mechanism or cap 50, which can utilize screw-threads, a bayonet mount, or similar means to secure the element to the pipe. In this particular application, element 30 includes a peg 36 to engage a notch 26 on the pipe, thereby preventing rotation of the element within the pipe. The lower end of element 30 includes an exhaust port 38, which can be used alone, or manifolded together with the exhaust ports of the other elements 31–35.

In operation, a slurry or mash is piped through the system in the direction indicated by the arrows. When the flowing mash encounters a drainage element 30–35, the mash is simultaneously mixed, pressurized, and encouraged to release its liquid through the respective drainage surface of that element.

Referring now to FIG. 2 with greater particularity, an elevated cross-sectional view of the system 10 is shown, taken along line 2—2 of FIG. 1. Here, the slots 40 in drainage element 30 can clearly be seen, and the view is looking "downstream" towards the other elements 31, 32, and 33. This view suggests that the arrangement of the elements in this particular manner would induce a counterclockwise spin to a mash flowing through the system, which may be desirable in certain applications. Of course, re-orienting of the elements would alter, or negate, that induced spin accordingly.

FIG. 3 is similarly a cross-sectional view of the system, this time taken along line 3—3 of FIG. 1, and looking "upstream⇌. Here, the slots on the various drainage elements 32, 31, and 30 can be readily seen.

FIG. 4 is a perspective view of a typical juice drainage element 30, as removed from the system. Here, the relation of the slots 40 to the element 30 are apparent.

While this invention has been described in connection with preferred embodiments thereof, it is obvious that modifications and changes therein may be made by those skilled in the art to which it pertains without departing from the spirit and scope of the invention. For example, in its broadest application, the juice drainage system of this invention is a liquid-solid separator, and could be used to deliquify or dewater any mixture or slurry. Furthermore, the desired mixing and pressure/non-pressure effects of the drainage elements can be enhanced by structural features fixed within the mash pipe itself, such as spirals, indentations, and the like. In addition, while the mash pipe itself will typically be generally cylindrical in shape, it could also vary in diameter over its length, which could assist in maintaining pump pressures over a distance. Accordingly, the scope of this invention is to be limited only by the appended claims.

What is claimed as invention is:

1. An apparatus for mixing a solid/liquid slurry and separating said liquid from said slurry, said apparatus comprising:
    a generally horizontal slurry pipe for carrying a flow of said slurry;
    a plurality of mixing elements each comprising a generally cylindrical tube, inserted completely through said slurry pipe at angles generally perpendicular to said slurry flow, said mixing elements intersecting said slurry pipe in noncoplanar orientation, each mixing element obstructing only a portion of said slurry flow;

drainage surfaces on each of said mixing elements comprising openings in said tubes allowing passage of said liquid, and preventing passage of said solid, into said mixing elements;

exit port means connected to a lower end of each of said mixing elements for enabling removal of said liquid from mixing elements; and attachment means for securing an upper end of each of said mixing elements to said slurry pipe, wherein when said slurry flows through said slurry pipe, said slurry contacts and is mechanically mixed by said non-coplanar mixing elements, and said liquid is separated from said slurry by passage through said drainage surfaces and exit port means.

2. The apparatus of claim 1 wherein said openings are hemicircumferential about said tubes, and said tubes are inserted into said slurry pipe so that said openings are oriented in the direction of said flow.

3. The apparatus of claim 2 wherein said openings comprise a plurality of slots.

4. The apparatus of claim 1 wherein said slurry pipe has an upper surface and a lower surface, and said mixing elements each include an exit port penetrating said slurry pipe lower surfce.

5. The apparatus of claim 1 wherein said attachment means comprise threaded caps.

* * * * *